(12) United States Patent
Pudvay (10) Patent No.: US 8,725,368 B2
(45) Date of Patent: May 13, 2014

(54) ROCKING ENABLED SHIFT-BY-WIRE SYSTEM

(75) Inventor: Stephen Lewis Pudvay, Howell, MI (US)

(73) Assignee: GM Global Technology Operations LLC

( * ) Notice: Subject to any disclaimer, the term of this patent is extended or adjusted under 35 U.S.C. 154(b) by 473 days.

(21) Appl. No.: 13/020,209

(22) Filed: Feb. 3, 2011

(65) Prior Publication Data

US 2012/0095657 A1 Apr. 19, 2012

Related U.S. Application Data

(60) Provisional application No. 61/392,620, filed on Oct. 13, 2010.

(51) Int. Cl.
*B60W 30/182* (2012.01)
*F16H 59/12* (2006.01)
*B60W 30/18* (2012.01)

(52) U.S. Cl.
CPC ......... *B60W 30/18045* (2013.01); *F16H 59/12* (2013.01); *F16H 2312/08* (2013.01)
USPC .................. 701/56; 701/51; 701/53

(58) Field of Classification Search
CPC ............ F16H 2312/08; F16H 2312/09; F16H 61/0204; F16H 61/0248; B60W 30/18045
USPC ......... 701/51, 53, 55, 56; 180/65.27; 903/930
See application file for complete search history.

(56) References Cited

U.S. PATENT DOCUMENTS

| | | | |
|---|---|---|---|
| 6,880,419 B2 | 4/2005 | Berger et al. | |
| 6,948,740 B2 | 9/2005 | Chernoff et al. | |
| 6,983,668 B2 | 1/2006 | Powell et al. | |
| 7,082,851 B2 | 8/2006 | Whitmarsh et al. | |
| 7,270,027 B2 | 9/2007 | Berger et al. | |
| 7,396,306 B2 | 7/2008 | Long et al. | |
| 7,476,173 B2 | 1/2009 | Ko | |
| 7,490,528 B2 | 2/2009 | Koski et al. | |
| 8,386,141 B2 * | 2/2013 | Tanaka et al. | 701/62 |
| 2009/0312918 A1 * | 12/2009 | Aubert Sola-Morales et al. | 701/48 |

\* cited by examiner

*Primary Examiner* — John R. Olszewski
*Assistant Examiner* — Todd Melton (57) ABSTRACT

A shift-by-wire system includes an incremental shift interface that generates an incremental shift signal. A rock control module enables a rocking mode and generates a rock control signal based on status of a vehicle parameter. The rocking mode includes shifting between a first mode and a second mode and back to the first mode. The first mode is one of a reverse mode and a drive mode and the second mode is the other one of the reverse mode and the drive mode. A shift interface module generates a shift control signal to shift a transmission of a vehicle between the first mode and the second mode based on the incremental shift signal and the rock control signal.

20 Claims, 4 Drawing Sheets

ROCKING ENABLED SHIFT-BY-WIRE SYSTEM

CROSS-REFERENCE TO RELATED APPLICATIONS

This application claims the benefit of U.S. Provisional Application No. 61/392,620, filed on Oct. 13, 2010. The disclosure of the above application is incorporated herein by reference in its entirety.

FIELD

The present disclosure relates to shift-by-wire systems and more particularly to electronic transmission range selection systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle may include an internal combustion engine and/or electric motor and a transmission. The transmission typically has Park, Reverse, Neutral and Drive operating modes. The transmission may include, for example, a reverse gear and several drive gears. The transmission is in the reverse gear and/or provides a reverse gear ratio during the Reverse mode. The transmission is in one of the drive gears and/or provides a selected drive gear ratio during the Drive mode.

Traditionally, a transmission is manually shifted between two of the operating modes by a vehicle operator via a transmission shifter. The transmission shifter is mechanically connected to levers, push/pull rods, cables, etc., which are used to change state and/or gears of the transmission.

As an alternative to using a mechanical shifter, shift-by-wire systems have been developed. An example shift-by-wire system includes a transmission shifter that is not mechanically connected to a transmission. A vehicle operator changes state of the transmission shifter. A module connected human/machine interface generates an electronic shift signal based on a current operator requested state of the transmission. The shift signal is received by an electronic transmission range selection (ETRS) system of the transmission. The ETRS system changes a current operating mode and/or gear of the transmission based on the shift signal.

SUMMARY

A shift-by-wire system is provided and includes an incremental shift interface that generates an incremental shift signal. A rock control module enables a rocking mode based on status of a vehicle parameter and generates a rock control signal. The rocking mode includes shifting between a first mode and a second mode and back to the first mode. The first mode is one of a reverse mode and a drive mode and the second mode is the other one of the reverse mode and the drive mode. A paddle shift module generates a shift control signal to shift a transmission of a vehicle between the first mode and the second mode based on the incremental shift signal and the rock control signal.

In other features, a method of operating a shift-by-wire system is provided and includes generating a paddle shift signal via a paddle shifter. A rocking mode is enabled based on status of a vehicle parameter and state of a mode selector interface. A rock control signal is generated. The rocking mode includes shifting between a first mode and a second mode and back to the first mode. The first mode is one of a reverse mode and a drive mode and the second mode is the other one of the reverse mode and the drive mode. A shift control signal is generated to shift a transmission of a vehicle between the first mode and the second mode based on the paddle shift signal and the rock control signal.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A shift-by-wire system may include an electronic transmission range selection (ETRS) interface. A vehicle operator selects an operating mode (i.e. Park, Reverse, Neutral, or Drive) of a transmission by or changing state of a corresponding switch (e.g., a push button switch) on the ETRS interface. The ETRS interface may be located, for example, on a dashboard of a vehicle. The term Drive mode refers to an operating mode in which a transmission gear or range associated with forward motion of the vehicle is selected.

In certain conditions, a vehicle operator may attempt to rock a vehicle. The terms rock and rocking refer to shifting a vehicle transmission two or more times between: (i) a Drive gear and/or range; and (ii) a Reverse gear and/or range. These shifts may occur during a short period of time and to perform vehicle maneuvers that include sequential changes in vehicle moving direction. This may be desired, for example, when one or more wheels of the vehicle is stuck in snow, mud, a pot hole, etc. In other conditions, a vehicle operator may desire shifting between: (i) a Drive gear and/or range; and (ii) a Reverse gear and/or range, such as when launching a boat of a trailer or when parallel parking a vehicle. Another example vehicle maneuver that may include rocking a vehicle is a 3-point vehicle turn.

Rocking maneuvers and/or maneuvers that include shifting between Drive and Reverse gears and/or ranges can be difficult using some ETRS interfaces (particularly push button-based interfaces). Quick shifts and/or multiple shifts are often performed during a rocking maneuver. A vehicle operator may need to look down at a dashboard or center console depending on location of the ETRS interface to change state of the appropriate mode switch for each shift. This causes a vehicle operator to remove his or her attention away from a road or environment surrounding a vehicle and increases time to perform the rocking maneuver. Time lost can negatively affect control of the vehicle momentum, prevent the vehicle from "breaking free" from a stuck location, overshooting an exit resulting in possible collision, etc.

Figure 1:
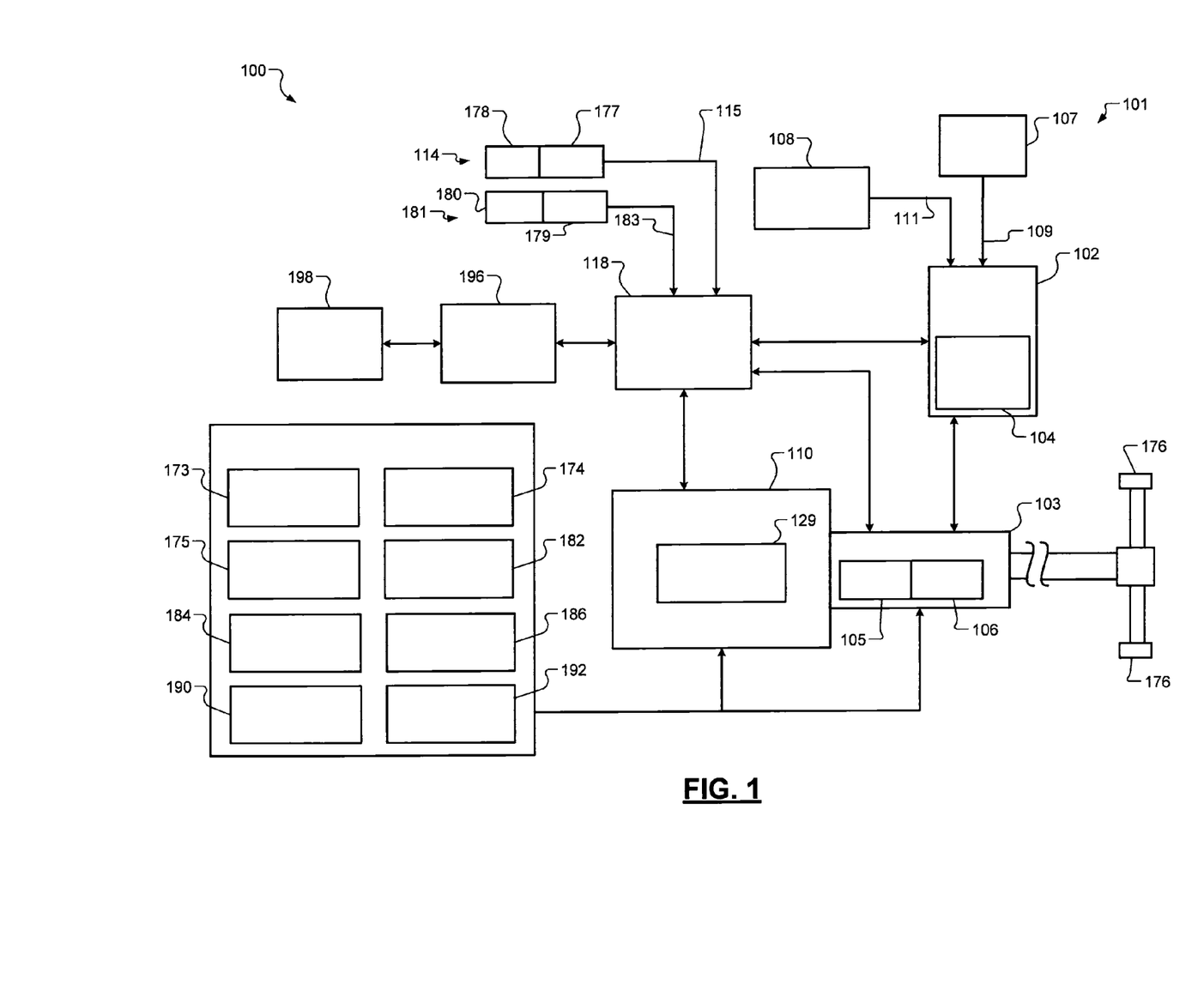
FIG. 1 is a functional block diagram of an vehicle control system incorporating a rocking enabled shift-by-wire (RESW) system in accordance with the present disclosure.

In FIG. 1, a functional block diagram of an exemplary vehicle control system 100 is shown. The vehicle control system 100 includes a rocking enabled shift-by-wire (RESW) system 101. Although in FIG. 1, the RESW system 101 is applied to a hybrid powertrain system, the RESW system 101 may be applied to non-hybrid and/or electric powertrain systems. An electric powertrain system refers to a powertrain system that includes one or more electric motors and does not include an internal combustion engine.

The RESW system 101 includes a transmission control module 102 and a transmission system 103. The transmission control module 102 includes a rock control module 104. The transmission system 103 includes an ETRS module 105 and a transmission 106. The rock control module 104 controls mode changes and shifts of the transmission 106 during a rocking mode. The rocking mode may be enabled based on one or more trigger events described below. The rock control module 104 signals the ETRS module 105 to change operating modes, gears and/or ranges of the transmission 106 during the rocking mode. The transmission 106 may be an automatic transmission, a dual clutch transmission, an electro-hydraulic controlled transmission, etc. A dual clutch transmission includes a first clutch for a first set of gears (e.g., odd gears) and a second clutch for a second set of gears (e.g., even gears).

The RESW system 101 operates in a first (non-rocking) mode and a second (rocking) mode. During the first mode, the ETRS module 105 may perform multiple shifts of the transmission 106 between the Park, Reverse, Neutral and Drive modes. Shifting between the Park, Reverse, Neutral and Drive modes is performed based on a state of the mode selector interface 107, indicated by interface signal INTERFACE (109). During the first mode, the ETRS module 105 may also change drive gears and/or ranges of the transmission 106. Any of the drive gears and/or ranges of the transmission 106 may be selected during the first mode.

During the second or rocking mode, the ETRS module 105 may perform multiple shifts of the transmission 106 between the Reverse, Neutral and Drive operating modes. The rock control module 104 may prevent operating in the Park mode during the rocking mode. Shifting between the Reverse, Neutral and Drive operating modes may be based on an incremental shift signal SINT (111) (e.g., a paddle shift signal) indicating states of the incremental human/machine shift interface 108 (e.g., paddle shifters and/or incremental interface module).

The number of selectable drive gears and/or ranges may be limited to a predetermined set of one or more drive gears and/or ranges during the rocking mode. For example, the transmission 106 may include six drive gears and/or ranges. The vehicle operator may be limited to, for example, selecting the first and/or the second gear during the rocking mode. The rock control module 104 may allow selection of gears 1-2 and may prevent selection of gears 3-6.

The rock control module 104 allows for quick shifting between Reverse, Neutral and Drive modes as well as between reverse and drive gears and/or ranges during the rocking mode. The shifts may be initiated via the paddle shifters 108. A vehicle operator may manually push or pull a selected one of the paddle shifters 108 to step between operating modes, gears and ranges during the rocking mode. Use of the paddle shifters 108, allows for quick shifting during a rocking maneuver without a vehicle operator taking his/her eyes of a road or environment surrounding the vehicle.

The vehicle control system 100 also includes an engine 110 that is connected to the transmission system 103. The engine 110 may be, for example, a compression-ignition engine or a spark-ignition engine and include an ignition system 129. The engine 110 is controlled by an engine control module (ECM) 118. The ECM 118 may communicate with the transmission control module 102 to coordinate shifting gears in the transmission 106. For example, the ECM 118 may reduce engine torque during a gear shift.

The vehicle control system 100 may includes various sensors. The vehicle control system 100 may include an engine speed sensor 173, a transmission speed sensor 174 and a wheel speed sensors 175. The sensors 173, 175 may be used to estimate speed of the vehicle. The wheel speed sensors 175 may be used to detect speeds of driven wheels 176 of the vehicle.

The vehicle control system 100 may further include an accelerator pedal sensor 177 that detects position of an accelerator pedal 178 of the accelerator pedal system 114. The accelerator pedal sensor 177 generates the pedal position signal PEDAL 115. A brake pedal sensor 179 may detect position of a brake pedal 180 of a braking system 181 and generate a brake pedal signal BRAKE 183.

An engine coolant temperature (ECT) sensor 182 may also be included and used to detect temperature of a coolant of the engine 110. Pressure within an intake manifold of the engine 110 may be measured using a manifold absolute pressure (MAP) sensor 184. Mass flow rate of air flowing into the intake manifold may be measured using a mass air flow (MAF) sensor 186.

The throttle actuator module 119 may monitor position of a throttle valve of the engine 110 using one or more throttle position sensors (TPS) 190. The ambient temperature of air being drawn into the engine 110 may be measured using an intake air temperature (IAT) sensor 192. The ECM 118 may use signals from the sensors to make control decisions for the vehicle.

The ECM 118 may communicate with a hybrid control module 196 to coordinate operation of the engine 110 and an electric motor 198. The electric motor 198 may also function as a generator, and may be used to produce electrical energy for use by vehicle electrical systems and/or for storage in a battery. In various implementations, various functions of the transmission control module 102, the ECM 118, and the hybrid control module 196 may be integrated into one or more modules.

Figure 2:
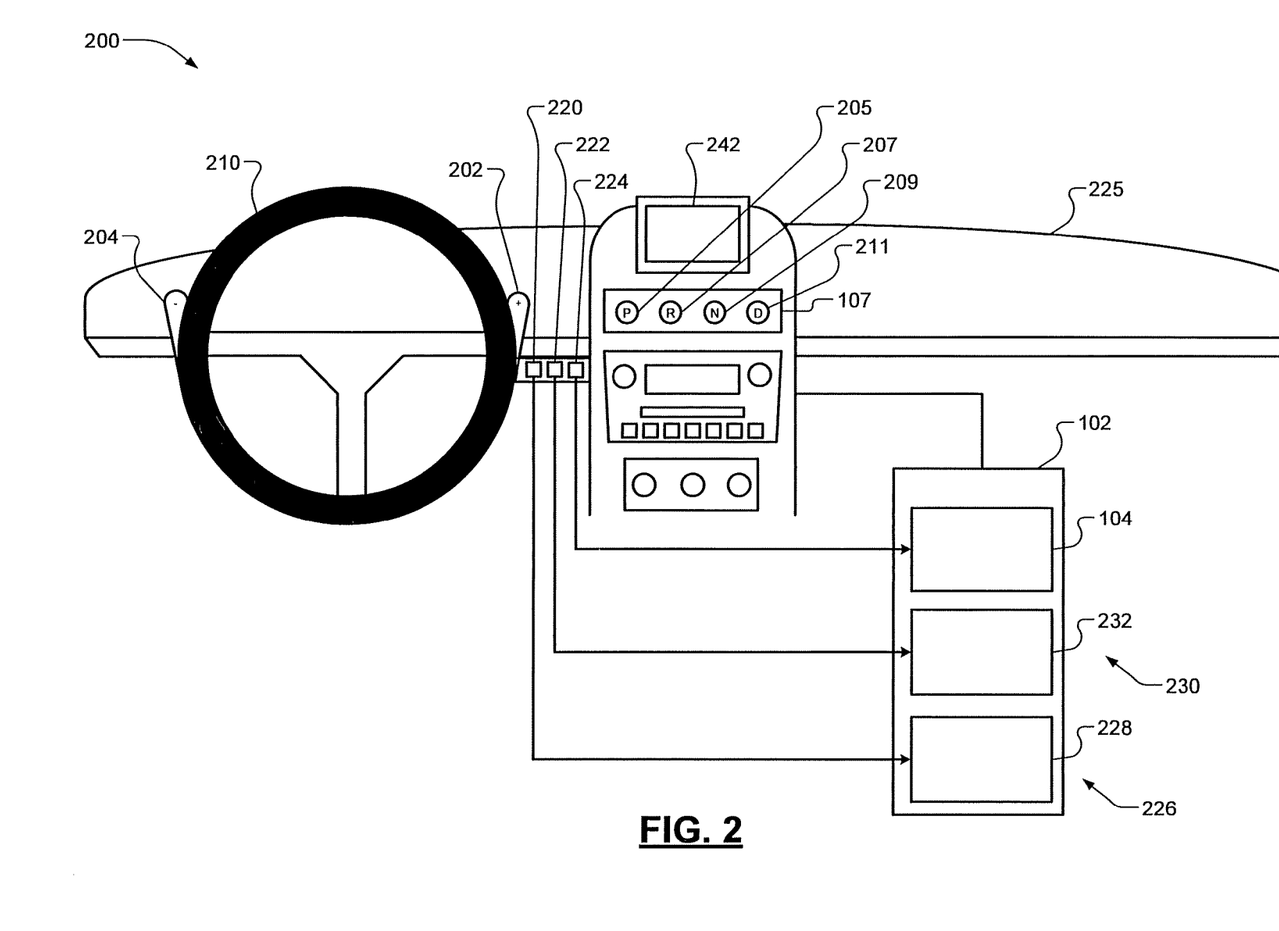
FIG. 2 is a perspective and functional block diagram of a portion of the RESW system in accordance with the present disclosure.

Referring now also to FIG. 2, a portion 200 of the RESW system 101 is shown. The portion 200 includes the TCM 102 with an ETRS system 201 (shown in FIG. 3), the mode selector interface 107, and first and second incremental shift interfaces 202, 204 (examples of the incremental shift interface 108 and shown as paddle shifters). The TCM 102 includes the rock control module 104. The mode selector interface 107 may include switches 205, 207, 209, 211, such as push buttons P, R, N, D for each of the respective Park, Reverse, Neutral and Drive modes.

During the non-rocking mode, a vehicle operator may push or switch one of the switches 205, 207, 209, 211 to select one of the Park, Reverse, Neutral and Drive modes. The vehicle operator may upshift and/or downshift through drive gears and/or ranges of the transmission 106 by actuating the incremental shift interfaces 202, 204, which may be located on or near a steering wheel 210, as shown. The incremental shift interfaces 202, 204 may be in other locations within the vehicle, such as on a center console. The first incremental shift interface 202 may be actuated to upshift and the second incremental shift interface 204 may be actuated to downshift.

During the rocking mode, the vehicle operator may shift between Reverse, Neutral and Drive modes and/or between reverse and drive gears 1-2 by actuation of the incremental shift interfaces 202, 204. The vehicle operator may shift between the Reverse, Neutral and Drive modes without pushing the push buttons R, N, D during the rocking mode. Upshift and downshift sequences may be followed when actuating the incremental shift interfaces 202, 204.

The upshift sequence performed by the RESW system 101 during the rocking mode may be, for example, Reverse-Neutral-First-Second. For each push or pull ("tap") of the first incremental shift interface 202, the rock control module 104 signals the ETRS module 105 to sequence the transmission 106 to the next sequence step in the Reverse-Neutral-First-Second sequence. For example, from Reverse-to-Neutral or Neutral-to-First or First-to-Second. In another embodiment, a shift to the second gear is prevented during the rocking mode. In yet another embodiment, shifts to a drive gear other than the drive gears 1-2 is permitted.

The downshift sequence performed by the RESW system 101 during the rocking mode may be, for example, Second-First-Neutral-Reverse. For each push or pull ("tap") of the second incremental shift interface 204, the rock control module 104 signals the ETRS module 105 to sequence the transmission 106 to the next sequence step in the Second-First-Neutral-Reverse sequence. For example, from Second-to-First or First-to-Neutral or Neutral-to-Reverse. The rocking mode may not permit a shift to the second drive gear or may permit a shift to drive gears other than drive gears 1-2.

The RESW system 101 may also include a traction control switch 220, an automatic parking switch 222 and/or a rocking mode switch 224. The switches 220, 222, 224 may be located on a dashboard 225 or elsewhere in a vehicle. The traction control switch 220 may be used to activate and/or deactivate a traction control (or anti-slip regulation) system 226. The traction control system 226 includes a traction control module 228 and is used to prevent loss of traction of driven wheels (wheels that receive torque from a powertrain) of the vehicle, such as the driven wheels 176.

The automatic parking switch 222 may be used to activate and/or deactivate an automatic parking system 230. The automatic parking system 230 includes a park control module 232 and autonomously maneuvers a vehicle from a traffic lane into a parking place by performing parallel, perpendicular or angle parking. The rocking mode switch 224 may be used to activate and/or deactivate the rocking mode.

The rocking mode may be enabled and/or disabled based on triggers others than the rocking mode switch 224. For example, the rocking mode may be activated (or enabled), for example, when: average vehicle speed is less than or equal to a second predetermined threshold; speed of the vehicle is less than or equal to a third predetermined threshold; the traction control system is deactivated, the automatic parking system is activated, a predetermined set of the switches 205, 207, 209, 211 (or push buttons P, R, N, D) are switched, and/or the switches 205, 207, 209, 211 are switched in a predetermined sequence or pattern. For example only, the third predetermined threshold may be equal to a garage shift inhibit speed of approximately 3-5 kilometers per hour (kph).

As an example, the rocking mode may be enabled when the vehicle speed is less than or equal to the third predetermined threshold and both the reverse and drive switches 207, 211 are switched at the same time and held in a depressed state for a predetermined period. As another example, the rocking mode may be enabled when the vehicle speed is less than or equal to the third predetermined threshold and both of the incremental shift interfaces 202, 204 are actuated at the same time and/or pushed or pulled for a predetermined period. The rock control module 104 may prevent activation of the rocking mode when: a driven wheel speed is greater than the first predetermined threshold; an average driven wheel speed is greater than the second predetermined threshold; and/or the vehicle speed is greater than the third predetermined threshold.

The rocking mode may be disabled, for example, when: a driven wheel speed is greater than the first predetermined threshold; an average driven wheel speed is greater than the second predetermined threshold; speed of the vehicle is greater than the third predetermined threshold; the traction control system is activated, the automatic parking system is deactivated, and/or one or more of the switches 205, 207, 209, 211 are switched. The rocking mode may also or alternatively be disabled by actuating the accelerator pedal 178 past a first predetermined position; actuating the brake pedal 180 past a second predetermined position; and/or deactivation of the ignition system 129. The ignition system 129 may be deactivated via a key switch, a push button start/stop switch, etc.

The RESW system 101 may further include a rocking mode indicator 240. The rocking mode indicator 240 may indicate to a vehicle operator that the vehicle is in the rocking mode. The rocking mode indicator 240 may be designated to indicate activation and deactivation of the rocking mode, may be a hazard light indicator, or other visual and/or audible vehicle indicator.

The RESW system 101 may further include a display 242, which may indicate to a vehicle operator and/or provide instructions on how to enable and/or disable the rocking mode. The indication and/or instructions may be provided for example when the traction control system 226 is deactivated and/or when the automatic parking system 230 is activated. The display 242 displays the instructions based on an instruction signal generated by the rock control module 104. The instruction signal may be generated based on a traction control signal generated by the traction control module 228 and/or an automatic parking signal generated by the park control module 232, such as the signals TracEnable (283) and ParkEnable (287) described below.

Figure 3:
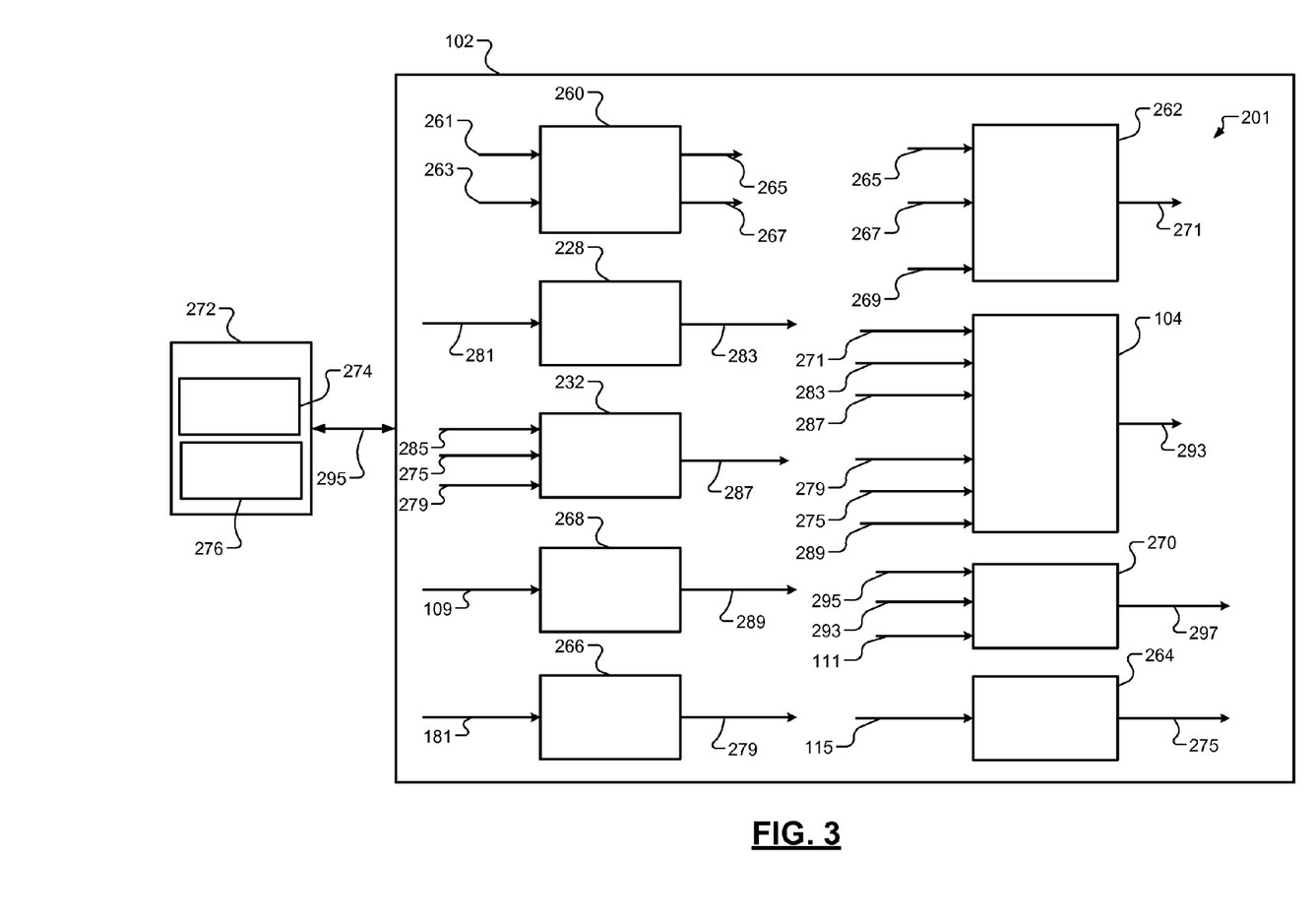
FIG. 3 is a functional block diagram of a transmission control module incorporating a rock control module in accordance with the present disclosure.

Referring now also to FIG. 3, the transmission control module 102 is shown. The transmission control module 102 includes a wheel speed module 260, a vehicle speed module 262, an accelerator module 264, a brake module 266, the traction control module 228, the park control module 232, a shift mode module 268, the rock control module 104 and a shift interface module 270.

The wheel speed module 260 determines the current speed and average speeds of the driven wheels 176. The wheel speed module 260 receives, for example, wheel speed sensor signals $S_{W1}$ (261), $S_{W2}$ (263) and generates driven wheel speed signals $W_{S1}$ (265), $W_{S2}$ (267).

The vehicle speed module 262 determines speed of the vehicle based on the driven wheel speed signals $W_{S1}$ (265), $W_{S2}$ (267) and/or a transmission speed signal $S_{Tran}$ (269), for example, from the transmission speed sensor 174. The vehicle speed module 262 generates a vehicle speed signal $S_{Veh}$ (271) based on the driven wheel speed signals $W_{S1}$ (265), $W_{S2}$ (267) and/or a transmission speed signal $S_{Tran}$ (269).

The accelerator module 264 determines position of the accelerator pedal 178 based on the pedal position signal PEDAL (115). The accelerator module 264 generates an accelerator position signal ACCEL (275) based on the pedal position signal PEDAL (115). The brake module 266 monitors position of the brake pedal 180 based on the brake pedal signal BRAKE (181) and generates a brake position signal BrakeAct (279).

The traction control module 228 activates traction control based on a traction control signal TracSwitch (281) from the traction control switch 220. The traction control module 228 generates a traction enable signal TracEnable (283) indicating whether traction control is activated. The park control module 232 activates automatic park control based on a park control signal ParkSwitch (285) from the park control switch 222, the accelerator position signal ACCEL (275), and the brake position signal BrakeAct (279). The park control module 232 generates a park enable signal ParkEnable (287) indicating whether automatic park control is activated.

The shift mode module 268 monitors state of the mode selector interface 107. The shift mode module 268 generates a mode selection signal MODE (289) based on the state of the mode selector interface 107 and/or an interface signal INTERFACE (109) received from the mode selector interface 107.

The rock control module 104 controls activation and deactivation of the rocking mode and generates a rock control signal ROCK (293) based on the vehicle speed signal $S_{veh}$ (271), the traction enable signal TracEnable (283), the park enable signal ParkEnable (287), accelerator position signal ACCEL (275), the brake position signal BrakeAct (279), and the mode selection signal 289. The rock control module 104 controls activation and deactivation of the rocking mode based directly on the wheel speed signals $W_{S1}$ (265), $W_{S2}$ (267).

The shift interface module 270 control shifting of the transmission 106 based on the incremental shift signal SINT (111), the rock control signal ROCK (293) and a selected shift map (295). The shift interface module 270 may generate a shift signal SHIFT (297), which may be provided to the ETRS module 105 based on the signals 111, 293 and the selected map 295. Any number of shift maps may be stored in memory 272. The shift maps may be selected based on the rock control signal ROCK (293). For example, a first set of shift maps 274 may be used when the RESW system 101 is not in rocking mode. A second set of shift maps 276 may be used when the RESW system 101 is in the rocking mode.

The first set of shift maps 274 may include shift sequences with drive gears and/or ranges. The shift sequences associated with the first set of shift maps 274 may not include a reverse gear or shifts to and from the Neutral mode. The second set of shift maps 276 may include shift sequences with Reverse, Neutral and Drive modes. Each of the shift sequences of the second set of shift maps 276 may have a limited number of drive gears and/or ranges, such as drive gears 1-2 and not drive gears 3-6.

Figure 4:
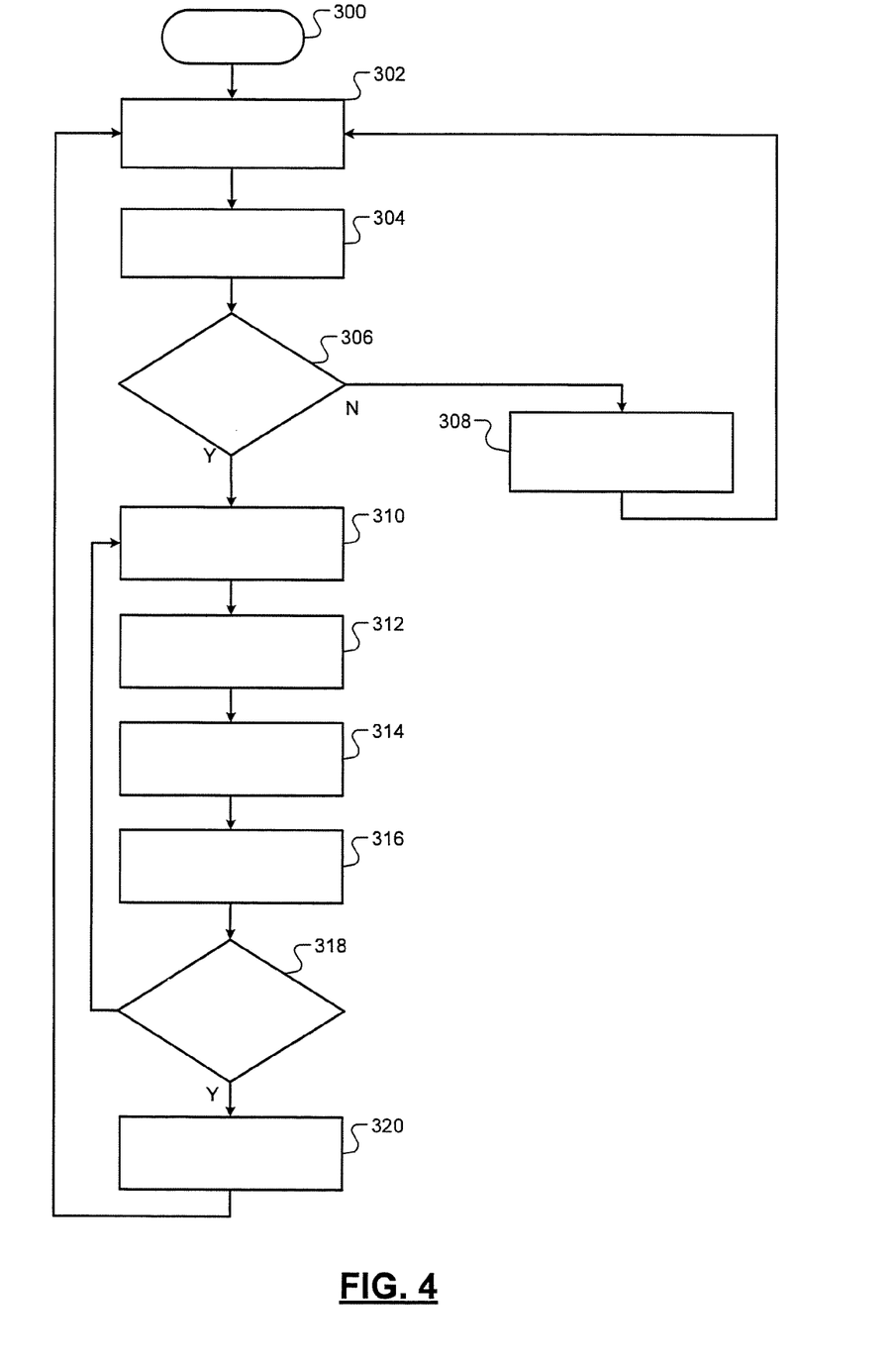
FIG. 4 illustrates a method of operating a RESW system in accordance with the present disclosure.

Referring now also to FIG. 4, a method of operating a RESW system is shown. Although the following tasks are primarily described with respect to the embodiments of FIGS. 1-3, the tasks may be easily modified to apply to other embodiments of the present invention. The method may begin at 300.

At 302, sensor signals are generated. The sensors signals may be generated by, for example, the sensors 173, 175, 177, 179, 182, 184, 186, 190 and 192. At 304, switch states are monitored, such as states of the switches of the mode selector interface 107 and states of the switches 220, 222, 224.

At 306, the rock control module 104 determines whether the rocking mode is triggered. The rock control module 104 generating the rock control signal ROCK (293) based on status of one or more vehicle parameters and/or systems. The vehicle parameters may include parameters associated with or derived from signals generated by, for example, the sensors 173, 175, 177, 179, 182, 184, 186, 190 and 192. The vehicle systems may include the RESW system 101, the transmission system 103, the ignition system 129, the traction control system 226, the automatic parking system 230, etc. Status of the vehicle systems may be based on status of the switches detected at 304. The rocking mode may be triggered as described above with respect to the embodiment of FIG. 2.

Task 308 is performed when the rocking mode has not been triggered, otherwise task 210 is performed. At 308, the rock control module 104 either selects non-rocking mode shift map(s) and/or sequence(s) or maintains use of current non-rocking mode shift map(s) and/or shift sequence(s). As an example, the first set of shift maps 274 may be used. Task 302 may be performed after task 308.

At 310, the rock control module 104 may enable the rocking mode and either selects rocking mode shift map(s) and/or sequence(s) or maintains use of current rocking mode shift map(s) and/or shift sequence(s). As an example, the second set of shift maps 276 may be used.

At 310, the rock control module 104 may remap the functionality of tap inputs (e.g., inputs from the incremental shift interfaces 108, 202, 204) to cycle through Reverse, Neutral, and Drive modes instead of manually selecting a Reverse gear and/or range, a Neutral position, and/or a Drive gear and/or range. The functionality of tap inputs may be based on the second set of shift maps 276 instead of being based the first set of shift maps 274.

At 312, the rock control module 104 may signal the traction control module 228 to deactivate the traction control system 226 during the rocking mode. This allows the ECM 118 and/or the TCM 102 to increase torque to the driven wheels 176.

At 314, sensors signals may be generated, as at 302. At 316, states of the switches may be detected, as at 304. At 318, the rock control module 104 determines whether deactivation of the rocking mode is triggered. The determination may be based on the sensor signals and switch states of tasks 314 and 316. The rocking mode may be disabled as described above with respect to the embodiment of FIG. 2. Task 320 is performed when the rocking mode is disabled, otherwise task 310 may be performed. At 320, the rock control module 104 selects non-rocking mode shift map(s) and/or shift sequence(s) as at 308. Task 302 is performed after task 320.

The above-described tasks are meant to be illustrative examples; the steps may be performed sequentially, synchronously, simultaneously, continuously, during overlapping time periods or in a different order depending upon the application.

The above-described embodiments allows a rocking maneuver to easily be performed using paddles shifters (incremental shift interface) without removing eye contact on a road forward or rearward of a vehicle. The embodiments prevent change of direction mode selection Reverse-to-Drive or Drive-to-Reverse due to inadvertent operator mode selection during certain conditions.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A shift-by-wire system comprising:
   a rock control module that enables a rocking mode based on status of a vehicle parameter and generates a rock control signal, wherein the rocking mode includes shifting from a first mode to a second mode and then back from the second mode to the first mode,
   wherein the first mode is one of a reverse mode and a drive mode and the second mode is the other one of the reverse mode and the drive mode; and
   a shift interface module that, in response to the rock control signal, generates a shift control signal to sequentially shift a transmission of a vehicle from the first mode to the second mode and then from the second mode back to the first mode.

2. The shift-by-wire system of claim 1, further comprising a vehicle speed module that generates a vehicle speed signal, wherein:
   the rock control module enables the rocking mode and generates the rock control signal based on the vehicle speed signal; and
   the rock control module enables the rocking mode when the vehicle speed signal is less than or equal to a predetermined threshold.

3. The shift-by-wire system of claim 1, further comprising a traction control module that generates a traction control signal,
   wherein the rock control module enables the rocking mode and generates the rock control signal based on the traction control signal.

4. The shift-by-wire system of claim 1, further comprising an automatic park module that generates an automatic parking signal,
   wherein the rock control module enables the rocking mode and generates the rock control signal based on the automatic parking signal.

5. The shift-by-wire system of claim 1, wherein:
   the shift interface module selects shift maps based on the rock control signal and selects:
      a first shift map when operating in a non-rocking mode, and
      a second shift map when operating in the rocking mode;
   the first shift map includes a first shift sequence of drive gears and does not include a reverse gear; and
   the second shift map includes a second shift sequence with the reverse gear and a drive gear,
   wherein the second shift map includes N of M drive gears, where N and M are integers, M is a number of drive gears of the transmission, and N is less than M.

6. The shift-by-wire system of claim 1, wherein:
   the rock control module disables the rocking mode based on an accelerator pedal signal, a brake pedal signal, and a mode selection signal; and
   the mode selection signal indicates a mode selected from a group comprising a park mode, the reverse mode, a neutral mode and the drive mode.

7. The shift-by-wire system of claim 1, further comprising a display that displays instructions for activating the rocking mode based on an instruction signal,
   wherein the rock control module generates the instruction signal based on at least one of a traction control signal and an automatic parking signal.

8. The shift-by-wire system of claim 1, wherein the rock control module disables a traction control system based on operation in the rocking mode.

9. The shift-by-wire system of claim 1, further comprising a shift mode module that monitors a state of a mode selector interface and generates a mode selection signal to shift between transmission driving modes based on the state of the mode selector, wherein:
   the transmission driving modes include the drive mode and the reverse mode;
   the rock control module enables the rocking mode when
      the vehicle parameter is less than or equal to a predetermined threshold,
      a first switch of the mode selector interface is switched while a second switch of the mode selector interface is switched; and
   the vehicle parameter is vehicle speed.

10. The shift-by-wire system of claim 1, wherein the rock control module disables the rocking mode based on an accelerator pedal position, a brake pedal position, and a state of an ignition system.

11. The shift-by-wire system of claim 1, further comprising an incremental shift interface, wherein:
    the incremental shift interface comprises a first switch and a second switch;
    the first switch is configured to incrementally shift between gears of the transmission;
    the second switch is configured to decrementally shift between the gears of the transmission; and
    the rock control module enables the rocking mode if
       the vehicle parameter is less than or equal to a predetermined threshold, and
       the first switch is switched while the second switch is switched.

12. The shift-by-wire system of claim 1, further comprising at least one interface comprising a plurality of switches, wherein:
    the at least one interface comprises
       an incremental shift interface for incrementally shifting between gears of the transmission, or
       a mode interface for shifting between the drive mode and the reverse mode; and
    the rock control module disables the rocking mode if at least two of a plurality of conditions exist, wherein the plurality of conditions include
       i) a driven wheel speed is greater than a first predetermined threshold,
       ii) an average drive wheel speed is greater than a second predetermined threshold,
       iii) a speed of the vehicle is greater than a third predetermined threshold,
       iv) a traction control system is activated or a parking system is deactivated, and v) two or more of the plurality of switches are switched during a same period of time.

13. The shift-by-wire system of claim 12, wherein the rock control module disables the rocking mode if at least three of the plurality of conditions exist.

14. A method of operating a shift-by-wire system comprising:
generating a paddle shift signal via a paddle shifter;
activating a rocking mode based on status of a vehicle parameter and state of a mode selector interface;
generating a rock control signal,
wherein the rocking mode includes shifting from a first mode to a second mode and then back from the second mode to the first mode, and
wherein the first mode is one of a reverse mode and a drive mode and the second mode is the other one of the reverse mode and the drive mode;
generating a shift control signal to shift a transmission of a vehicle between the first mode and the second mode based on the paddle shift signal and the rock control signal; and
generating at least one of a traction control signal and an automatic parking signal,
wherein the rocking mode is enabled and the rock control signal is generated based on the traction control signal or the automatic parking signal.

15. The method of claim 14, wherein the rocking mode is enabled when:
the vehicle parameter is less than or equal to a predetermined threshold; and
a first switch of the mode selector interface is switched while a second switch of the mode selector interface is switched,
wherein
the first switch is configured to select the drive mode,
the second switch is configured to select the reverse mode, and
the vehicle parameter is vehicle speed.

16. The method of claim 14, wherein the rocking mode is enabled and the rock control signal is generated based on the traction control signal and the automatic parking signal.

17. The method of claim 14, further comprising:
selecting shift maps based on the rock control signal;
selecting a first shift map when operating in a non-rocking mode; and
selecting a second shift map when operating in a rocking mode,
wherein:
the first shift map includes a first shift sequence of drive gears and does not include a reverse gear,
the second shift map includes a second shift sequence with the reverse gear and a drive gear, and
the second shift map includes N of M drive gears, where N and M are integers, M is a number of drive gears of the transmission, and N is less than M.

18. A shift-by-wire system comprising:
an interface comprising a plurality of switches, wherein the plurality of switches are configured to switch between transmission driving modes, and wherein the plurality of switches include a first switch and a second switch;
a rock control module that enables a rocking mode based on a vehicle speed and generates a rock control signal, wherein the rocking mode includes shifting from a first mode to a second mode and then back from the second mode to the first mode,
wherein the first mode is one of a reverse mode and a drive mode and the second mode is the other one of the reverse mode and the drive mode; and
a shift interface module that, based on the rock control signal, generates a shift control signal to shift a transmission of a vehicle from the first mode to the second mode and then back from the second mode to the first mode,
wherein the rock control module enables the rocking mode if
the vehicle speed is less than or equal to a predetermined threshold, and
the first switch is switched while the second switch is switched.

19. The shift-by-wire system of claim 18, wherein:
the interface is an incremental shift interface;
the first switch is configured to incrementally shift between gears of the transmission; and
the second switch is configured to decrementally shift between the gears of the transmission.

20. The shift-by-wire system of claim 18, further comprising a shift mode module that monitors states of the plurality of switches of the interface and generates a mode selection signal to shift between transmission driving modes based on the states of the plurality of the switches, wherein:
the transmission driving modes include the drive mode and the reverse mode;
the first switch is configured to select the drive mode; and
the second switch is configured to select the reverse mode.

* * * * *